J. VOLCKHAUSEN.
VALVE.
APPLICATION FILED MAY 15, 1918.
1,341,828.
Patented June 1, 1920.
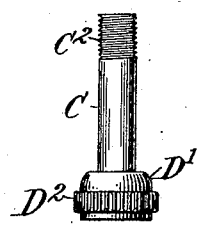
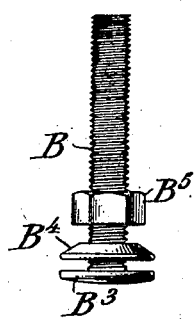
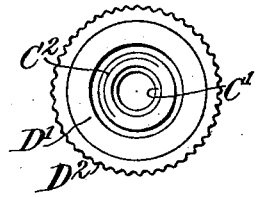
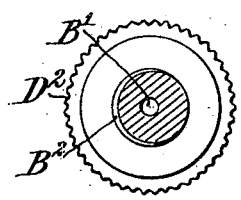
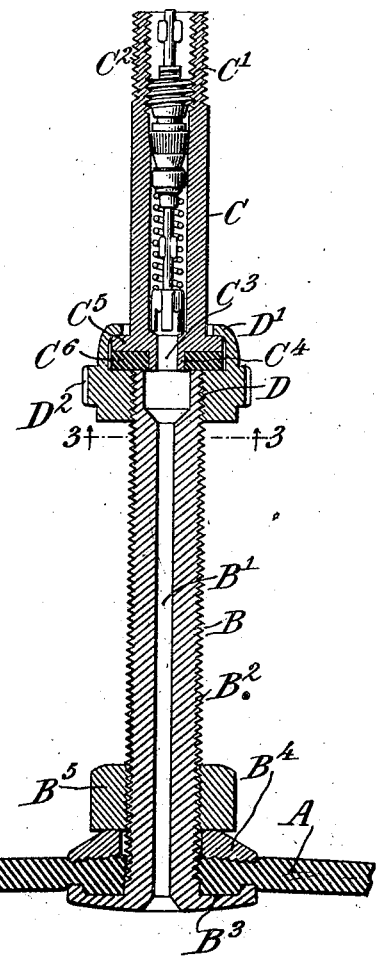
WITNESS:
René Bruine
INVENTOR
Julius Volckhausen
By Attorneys,

UNITED STATES PATENT OFFICE.

JULIUS VOLCKHAUSEN, OF WEEHAWKEN, NEW JERSEY, ASSIGNOR TO A. SCHRADER'S SON, INCORPORATED, OF BROOKLYN, NEW YORK, A CORPORATION OF NEW YORK.

VALVE.

1,341,828.     Specification of Letters Patent.      Patented June 1, 1920.

Application filed May 15, 1918. Serial No. 234,661.

*To all whom it may concern:*

Be it known that I, JULIUS VOLCKHAUSEN, a citizen of the United States of America, residing in Weehawken, in the county of Hudson and State of New Jersey, have invented certain new and useful Improvements in Valves, of which the following is a specification.

My invention relates to vulcanizing valves for pneumatic tires, and its chief purpose is to afford a vulcanizing attachment for tire tubes, in order to protect the permanent valve housing and valve parts against damage and knocks during the manufacturing operation of vulcanizing the tube.

In the vulcanizing process the tire tube is apt to be thrown around considerably and rather roughly handled, and the improvement comprises an attachment which can be readily positioned on the tube and is built more ruggedly than the usual valve housing, while the valve itself is arranged in a housing that is separate from the fitting which enters the tube and is removably attached thereto.

The invention consists generally of a stem or fitting that is attachable to a tire tube and has an interior passage communicating with the latter. The wall of the stem referred to is sufficiently thick to withstand the ordinary rough usage to which it is likely to be subjected in the vulcanizing process, and the valve that controls ingress and egress of air to the tube is arranged in a separate housing that is carried upon the stem and held in operative relation by a removable coupling or connection.

The invention consists of certain other improvements and combination of parts as will be hereinafter more fully described and pointed out in the following claims.

In the drawings

Figure 1 is a sectional view illustrating a preferred embodiment of the invention on an enlarged scale.

Fig. 2 is an end view.

Fig. 3 is a transverse sectional view on the line 3—3 of Fig. 1.

Fig. 4 is a side elevation of the valve housing and coupling, and

Fig. 5 is a side elevation of the removable stem to which the valve housing is attached.

In the present arrangement which is intended primarily by way of example, and not as limiting the invention to the specific form shown, A designates the tire tube or any other member which is inflatable, to which is temporarily attached a stem B, which has an interior passage B' communicating with the interior of the casing. The stem is exteriorly threaded at $B^2$ from one end to the other, and at its inner end is provided with a flange $B^3$ which engages the inner surface of the tube. The stem is held in place in the tire tube by means of a clamping plate or collar $B^4$ engaging the exterior of the tube and retained by a threaded nut $B^5$ which engages the exterior threaded portion of the stem.

The exterior diameter of the stem is of the standard size of the permanent valve housings or so-called valve stems found in the completed tire, but the wall of the stem surrounding the interior passage B is considerably thicker than the wall of the permanent valve housing. This is made possible, because in the latter, sufficient space must be provided interiorly to accommodate the valve insides, and as the exterior diameter is fixed, the wall must be made comparatively thin, whereas in the present arrangement the valve is accommodated independently of the stem B and passage B' so that the said passage can be made relatively quite small and the wall of the stem is consequently thick and rugged enough to stand up under any amount of rough treatment.

The controlling valve and coöperating parts are arranged in a separate and independent housing C, which is interiorly threaded at C' to receive the valve insides, and exteriorly threaded at $C^2$ to accommodate an air connection or coupling. The housing C has an interior passage $C^3$ which communicates with the passage B in the stem. Arranged at the inner end of the housing C is a collar or tubular extension $C^4$, while adjacent thereto, the housing is provided with a flange $C^5$. The collar $C^4$ receives a washer or packing $C^6$ which rests against the outer end of the stem to afford an air-tight connection, and the valve housing is held in place on the stem by means of a coupling having a threaded portion D which coöperates with the stem and an overhanging portion or flange $D^1$ which engages the flange or shoulder $C^5$. The exterior side wall of the coupling is milled at $D^2$ to provide a finger portion for turning it readily, and by this adjustment of the coupling, the valve housing can be brought into rigid and air-tight engagement with the stem.

While I have seen fit to describe herein the details of the invention with reference to a specific form, I do not wish to limit my improvement to any particular arrangement, as the invention may be carried out in various ways and by modifications without essentially departing from the underlying characteristics or the scope of the claims.

What I claim is:—

1. A tire vulcanizing attachment comprising a hollow stem attachable to a tire tube, a valve housing detachably secured to said stem and communicating therewith, and valve insides arranged in the housing, said stem having a bore too small to admit said valve insides.

2. A tire vulcanizing attachment comprising a hollow stem attachable to a tire tube, said stem having a thick wall, a separate valve housing carried by said stem and communicating therewith, and valve insides arranged in said housing, said stem having a bore too small to admit said valve insides.

3. A tire vulcanizing attachment comprising a hollow stem attachable to a tire tube, said stem having an interior passage and a comparatively thick surrounding wall, a valve housing detachably secured to said stem, the housing having an exterior diameter equal to that of the stem and an interior passage of greater diameter than that of the stem, and valve insides arranged within the housing.

4. A tire vulcanizing attachment comprising a hollow exteriorly threaded stem attachable to a tire tube, a valve housing positionable on the extreme end of said stem, and a coupling coöperating with the valve housing and having threaded engagement with the stem, said stem having a bore too small to admit said valve insides.

5. A tire vulcanizing attachment comprising a hollow exteriorly threaded stem attachable to a tire tube and having an inner passage and a comparatively thick surrounding wall, a valve housing positionable against the outer end of said stem, said housing having an exterior diameter equal to that of the stem and an interior passage of greater diameter than that of the stem, a shoulder on the housing, valve insides arranged in said interior passage of the housing and a coupling engaging the shoulder and having threaded engagement with the exterior of said stem.

6. A tire vulcanizing attachment comprising a hollow stem attachable to a tire tube and having a comparatively thick wall, an independent valve housing having the same exterior diameter as the stem and communicating therewith, valve insides arranged in the valve housing and means for detachably securing the valve housing on said stem, said stem having a bore too small to admit said valve insides.

In witness whereof, I have hereunto signed my name.

JULIUS VOLCKHAUSEN.